Figure 1:
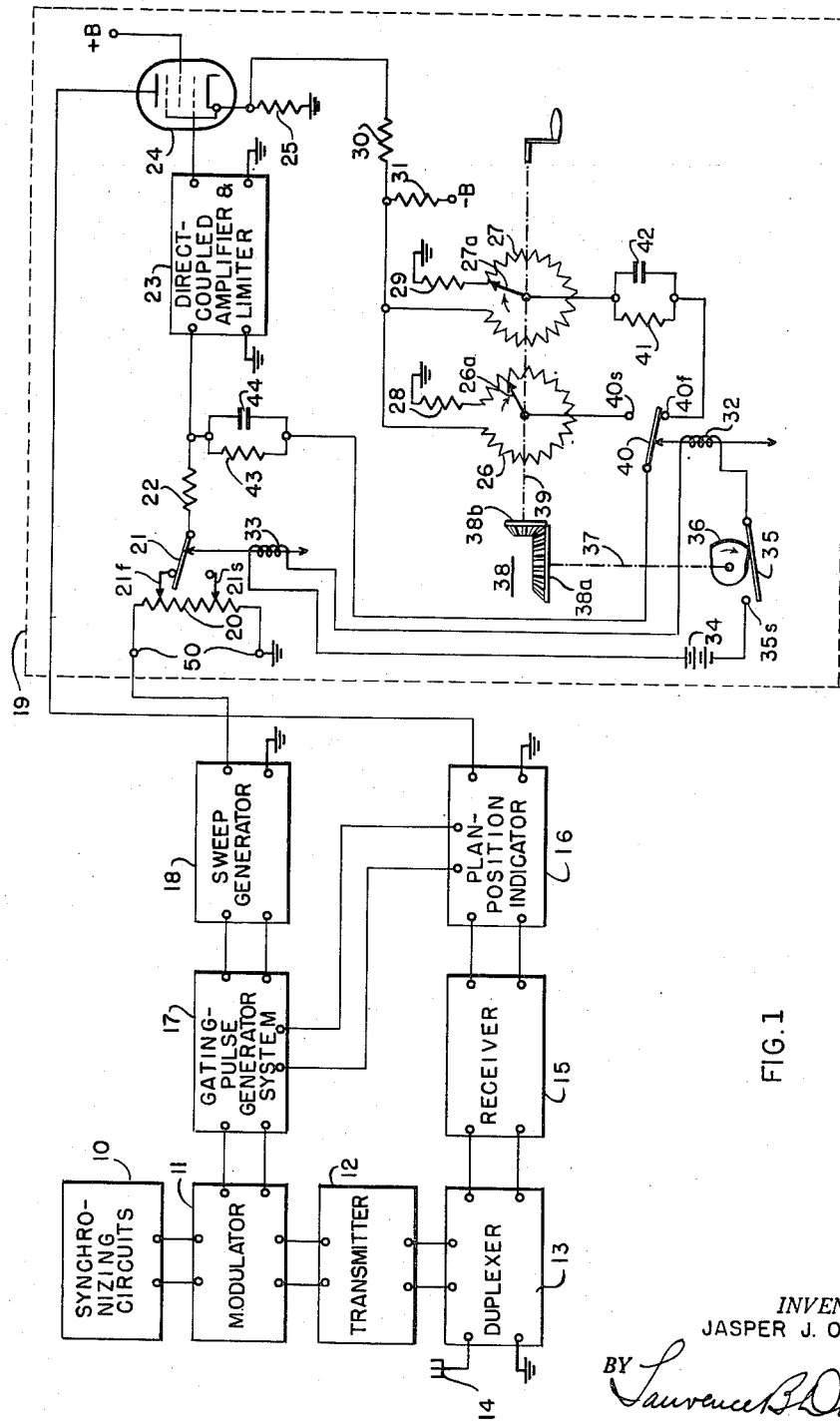

June 14, 1955

J. J. OKRENT 2,710,914

PERIODIC SIGNAL SWEEP SPEED CONTROL SYSTEM

Filed Sept. 13, 1951.

2 Sheets-Sheet 1

INVENTOR.
JASPER J. OKRENT

BY Laurence B Dodds

ATTORNEY

June 14, 1955
J. J. OKRENT
2,710,914
PERIODIC SIGNAL SWEEP SPEED CONTROL SYSTEM
Filed Sept. 13, 1951
2 Sheets-Sheet 2
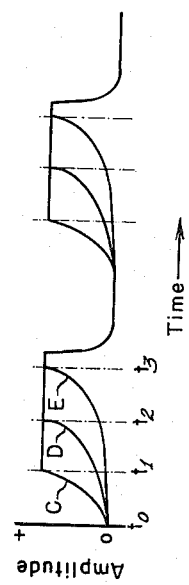
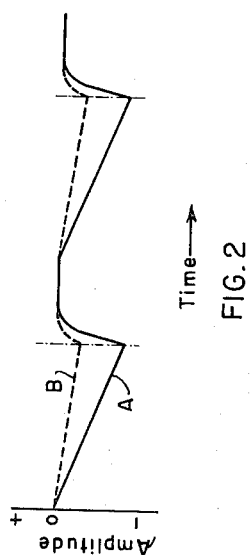
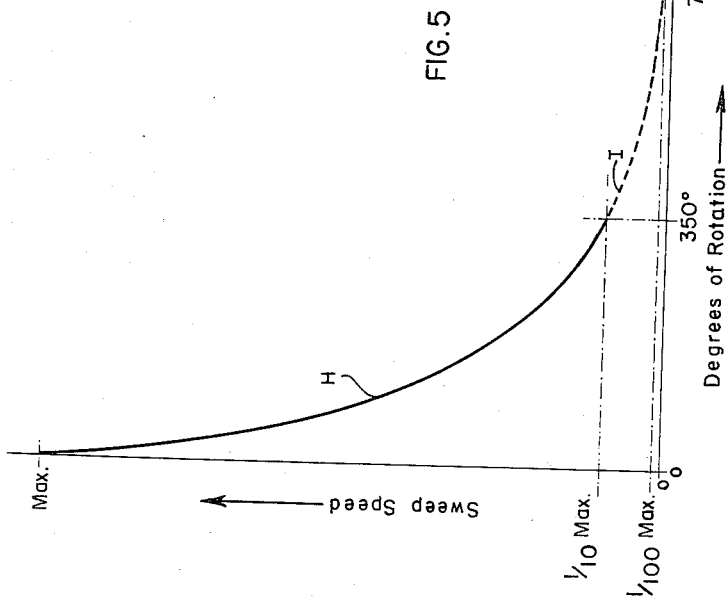
INVENTOR.
JASPER J. OKRENT
BY
ATTORNEY

United States Patent Office 2,710,914
Patented June 14, 1955

2,710,914

PERIODIC SIGNAL SWEEP SPEED CONTROL SYSTEM

Jasper J. Okrent, Flushing, N. Y., assignor to Hazeltine Research, Inc., Chicago, Ill., a corporation of Illinois Application September 13, 1951, Serial No. 246,457

10 Claims. (Cl. 250—27)

The present invention relates to periodic signal sweep speed control systems and, more particularly, to such control systems of the type which adjusts over a wide range of sweep speeds a periodic signal having a magnitude which sweeps over a range of magnitudes. Such a control system has particular utility in a radar system and, hence, will be specifically described in that environment.

A radar system has been proposed in which the sweep speed of the output signal of a sweep generator coupled to the deflection circuit of a plan-position indicator of the cathode-ray tube type has controlled the display on the cathode-ray tube screen. The radar system utilized a manually controlled adjustment to change the sweep speed in discrete steps and, hence, to change the target range displayed on the cathode-ray tube in discrete steps. Such systems have had the disadvantage of providing a limited number of discrete sweep speeds and, hence, a limited number of target ranges for display on the cathode-ray tube. Further, due to the change in the location of a given target on the screen of the cathode-ray tube when switching from range to range, it has been difficult for an operator visually to track such target.

A system has been proposed for continuously varying the sweep speed of the periodic sweep signal over a limited range to facilitate visual tracking of a target over that range and to permit adjustment of a cathode-ray tube display to a desired scale. The range of sweep speeds obtainable in this system has been limited by the range over which a single parameter of the system may readily be varied without impairing circuit operation because of, for example, tube microphonics or power-supply ripple. This limited range may be, for example, approximately a 10:1 range of values or less. Accordingly, such a system has had the disadvantage of not being readily applicable to a radar system which searched for targets over wide ranges of distances and displayed target ranges having a maximum-to-minimum range ratio of, for example, approximately 100:1 or more.

It is an object of the present invention, therefore, to provide a new and improved periodic signal sweep speed control system which avoids one or more of the above-mentioned disadvantages and limitations of systems heretofore proposed.

It is another object of the invention to provide a new and improved periodic signal sweep speed control system for adjusting over a wide range of sweep speeds a periodic signal having a magnitude which sweeps over a range of magnitudes.

It is still another object of the invention to facilitate tracking of a target display on an indicator of a radar system by means of a new and improved periodic signal sweep speed control system for continuously adjusting over a wide range of sweep speeds a periodic signal having a magnitude which sweeps over a range of magnitudes.

In accordance with a particular form of the invention, in a system for supplying a periodic signal having a magnitude which sweeps over a range of magnitudes at a speed which is adjustable over a wide range of speeds, a control system for adjusting the sweep speed of the supplied signal comprises a first circuit means adjustable to a plurality of sweep speed range-control values for adjusting a first sweep speed control parameter of the control system to determine a range of magnitude sweep speeds for each value thereof. The control system also includes a second circuit means adjustable over a range of values for continuously adjusting a second sweep speed control parameter of the control system to vary the magnitude sweep speed of the supplied signal over each determined range and means responsive to the adjustment of the second circuit means and effective at a predetermined point in the range of adjustment thereof to adjust the first circuit means to a different value for determining another range of magnitude sweep speeds.

For a better understanding of the present invention, together with other and further objects thereof, reference is had to the following description taken in connection with the accompanying drawings, and its scope will be pointed out in the appended claims.

In the accompanying drawings, Fig. 1 is a circuit diagram, partly schematic, of a radar system including a periodic signal sweep speed control system in accordance with a particular form of the invention; while Figs. 2–5, inclusive, are graphs utilized in explaining the operation of the Fig. 1 control system.

Description of Fig. 1 radar system

Referring now more particularly to Fig. 1 of the drawings, the radar system there represented comprises the usual synchronizing circuits 10 which may include a repetition rate oscillator for determining the repetition rate of the radar system. The synchronizing circuits 10 are coupled to a suitable transmitter 12 through a conventional modulator 11 for periodically firing the transmitter 12. The transmitter 12 is, in turn, coupled through a duplexer 13 to an antenna 14 for applying thereto repetitive bursts of wave-signal energy for transmission to a target. The duplexer 13 may be a protective device, such as one of the types described in Chapter XI of the text "Principles of Radar," Second Edition, by Members of the Staff of the Radar School of Massachusetts Institute of Technology, McGraw-Hill, 1946.

The antenna 14 is also coupled through the duplexer 13 to a suitable receiver 15 for applying thereto echo signals returned from targets in the range of the radar system in response to the pulses transmitted thereby. The receiver 15 is coupled to an input circuit of a plan-position indicator 16 which may comprise a cathode-ray tube for displaying on the screen thereof video-frequency components of the echo signals intercepted by the antenna 14.

The output circuit of the modulator 11 is coupled to a gating pulse generator system 17 for generating a gating pulse in response to each modulator pulse, and may be similar to that described and claimed in applicant's co-pending application Serial No. 246,456, filed September 13, 1951, entitled "Control System for Automatically Varying the Duration of Repetitive Pulses." The output circuit of the gating pulse generator system 17 is coupled to a sweep generator 18 of a suitable type for supplying a periodic signal having a magnitude which sweeps over a range of magnitudes at a predetermined speed. The sweep generator 18 is coupled to a deflection circuit of the plan-position indicator 16 through a unit 19, which comprises a periodic signal sweep speed control system, constructed in accordance with the invention and more fully described hereinafter, for adjusting the sweep speed of the signal supplied by the sweep generator 18 and the unit 19 to the indicator 16.

The output circuit of the gating pulse generator 17 is also coupled to an input circuit of the plan-position indicator 16 for rendering conductive the cathode-ray tube of the indicator during the sweep time of the supplied signal.

Units 10–13, inclusive, the antenna 14 and units 15, 16 and 18 may all be of conventional construction and operation so that a detailed description and explanation of the operation thereof are deemed unnecessary herein.

*Operation of Fig. 1 radar system*

Briefly considering the operation of the Fig. 1 radar system as a whole, the synchronizing circuits 10 apply to the modulator 11 repetitive pulses having a repetition rate determined by the frequency of the repetition rate oscillator of the unit 10 for periodically triggering the modulator 11. In response to these trigger pulses, the modulator 11 operates in a well-known manner periodically to fire the transmitter 12 thereby causing the transmitter to apply to the antenna 14 through the duplexer 13 repetitive bursts or pulses of wave-signal energy. During the application of these pulses to the antenna 14, the duplexer 13 operates in a well-known manner to protect the receiver 15 from overloading which the transmitted pulses would otherwise cause.

During the intervals between the transmitted pulses, the antenna 14 intercepts wave-signal energy returned thereto from targets within the range of the radar system and applies these signals to the receiver 15 through the duplexer 13. The receiver 15 amplifies these signals and detects the video-frequency components thereof which are applied with suitable amplification to an input circuit of the plan-position indicator 16.

Each output pulse from the modulator 11 is applied thereby to the gating pulse generator system 17 which repetitively generates gating pulses in response thereto. The unit 17 applies the repetitive gating pulses to a gated circuit of the sweep generator 18 which generates a signal having a magnitude which sweeps over a range of magnitudes at a predetermined speed during the interval of each gating pulse. The output signal of the sweep generator 18 is then applied to the unit 19 which derives therefrom a signal having an adjustable sweep speed for application to the deflection circuit of the plan-position indicator 16.

The gating pulse generator system 17 also applies repetitive gating pulses to the plan-position indicator 16 to render conductive the cathode-ray tube of that indicator during the sweep time of the signal applied thereto by the unit 19.

*Description of Fig. 1 control system*

Referring now more particularly to the unit 19 of the Fig. 1 radar system, that unit comprises a control system for adjusting the sweep speed of the signal supplied by the sweep generator 18 and the unit 19 to the indicator 16. The control system comprises a first circuit means adjustable to a plurality of values for adjusting a first parameter of the control system to determine a range of sweep speeds for each value thereof. More particularly, this circuit means preferably is included in an amplifier input circuit and is responsive to the periodic signal applied thereto by the sweep generator 18 and a pair of supply terminals 50, 50 coupled to the unit 18. The first circuit means comprises, for example, a signal divider, specifically a voltage divider including a tapped resistor 20 and a switch element 21 associated therewith, adjustable to a plurality of resistance values determined by the tap points 21f and 21s. The voltage divider 20, 21 is coupled to the supply terminals 50, 50 for deriving a second periodic signal from the signal applied thereto by the sweep generator 18 and the terminals 50, 50. The voltage divider is adjustable to a plurality of values for adjusting the magnitude of the second periodic signal to determine a range of sweep speeds for the output signal of the unit 19 for each value of the voltage divider and, thus, for each sweep speed of the second periodic signal.

The voltage divider 20, 21 is coupled through a resistor 22 to a direct-coupled amplifier and limiter 23 which preferably comprises an odd number, for example three, of direct-coupled inverting amplifier stages having suitable amplitude-limiting circuits, for example, of the type described and claimed in applicant's copending application entitled "Signal Magnitude Control System," Serial No. 246,458, filed concurrently herewith, now Patent No. 2,668,237, dated February 2, 1954. The output circuit of the direct-coupled amplifier and limiter 23 is coupled to the control electrode-cathode circuit of a power amplifier tube 24 having a cathode resistor 25. The screen electrode of the tube 24 is connected to a source +B while the suppressor electrode is connected to the cathode in a conventional manner. The anode of the tube 24 is coupled to a deflection circuit of the plan-position indicator 16 which may include a suitable source of positive potential for that anode.

The control system also includes a second circuit means adjustable over a range of values for continuously adjusting a second parameter of the control system to vary the sweep speed of the output signal of the unit 19 over each of the above-mentioned determined ranges. More particularly, the second circuit means preferably comprises a degenerative feed-back circuit coupled between the output circuit of the sweep-signal supply system 18, 19 and the amplifier input circuit 20—22 and including a pair of signal dividers for deriving a pair of signals from the output signal of the unit 19 for application to the amplifier input circuit, each divider being adjustable over a range of values for continuously adjusting the gain characteristic of the control system. Specifically, the signal dividers comprise a pair of adjustable voltage dividers 26, 27, having movable arms 26a and 27a, respectively, and coupled in parallel across the cathode resistor 25 through a pair of similar resistors 28 and 29, respectively, and through a voltage divider comprising resistors 30 and 31 coupled to a source —B. The source —B has a value selected to develop zero potential at the junction of the resistors 30 and 31 when the current flow through the cathode resistor 25 and the deflection circuit of the plan-position indicator 16 positions the cathode-ray beam of the indicator 16 in the center of the display screen thereof. The voltage dividers 26, 27 preferably are of like construction and wound with a logarithmic taper to provide a logarithmic signal ratio-displacement characteristic.

The adjustable arm 26a of the voltage divider 26 is connected to a switch point 40s while the arm 27a of the voltage divider 27 is coupled through a feed-back resistor 41 and high-frequency by-pass condenser 42 to a switch point 40f. The switch points 40s and 40f are associated with a switch element 40 coupled to the input circuit of the direct-coupled amplifier and limiter 23 through a feed-back resistor 43 and high-frequency by-pass condenser 44.

From the foregoing description, it will be understood that by first and second parameters of the control system is meant two different parameters, for example, the gain of the control system of the unit 19 and the attenuation of the input signal derived by the signal divider 20, 21 from the output signal of the sweep generator 18.

The control system also includes means responsive to the adjustment of the second circuit means including the elements 26, 27 and effective at a predetermined point in the range of adjustment thereof, specifically at the point corresponding to the end of one of the aforesaid determined ranges of sweep speeds, to adjust the first circuit means 20, 21 to a different value for determining another range of sweep speeds. The responsive means comprises a relay circuit including a pair of relays 32, 33 which are coupled in series relation with a suitable source of potential, indicated as a battery 34, through a normally closed switch comprising a switch point 35s and a switch element 35 operated by a rotatable cam 36. The relays 32 and 33 operate the switch elements 40 and 21, respectively, which are represented in positions corresponding to the deenergized condition of the relays.

The cam 36 is mechanically coupled, as indicated by the broken line 37, to a suitable gear mechanism 38 preferably having a 2:1 ratio between the elements 38a and 38b thereof, respectively. The gear 38b is mechanically coupled to the adjustable arms 26a and 27a of the voltage dividers 26 and 27, respectively, as represented by a broken line 39 and to a crank for manually controlling the positions of the adjustable arms 26a, 27a and the cam 36. As shown in the diagram, the arm 27a is in the maximum counterclockwise position of adjustment thereof for providing the maximum sweep speed for the output signal of the unit 19. The arm 26a leads the arm 27a in position by, for example, ten degrees. The values of the first circuit means 20, 21 preferably are so proportioned with respect to the values of the second circuit means at either side of the above-mentioned predetermined point in the range of adjustment of the voltage dividers 26, 27 that the minimum sweep speed in one determined range is substantially the same as the maximum sweep speed in the succeeding predetermined range, thereby effectively providing a single continuous wide range of sweep speeds.

Operation of Fig. 1 control system

The operation of the Fig. 1 control system and the results obtained thereby may best be explained by referring to Figs. 2, 3, 4 and 5 of the drawings. Fig. 2 is a graph with a linear-time scale which represents the amplitude-time characteristics of the input signal to the unit 23 under various operating conditions while Fig. 3 is a graph with a logarithmic-time scale which represents the signal developed across the resistor 25 under corresponding operating conditions. Curve A of Fig. 2 represents the output signal of the sweep generator 18 and, hence, the signal supplied by the voltage divider 20, 21 with the switch elements 21, 35 and 40 in the positions represented in the diagram. The signal represented by curve A is applied by the voltage divider 20, 21 through the resistor 22 to the direct-coupled amplifier and limiter 23 wherein it is amplified and limited. The output signal of the direct-coupled amplifier and limiter 23 is then applied to the control electrode of the tube 24 causing a current having a saw-tooth portion to flow through the cathode resistor 25 of the tube 24 and the deflection yoke of the plan-position indicator 16. The potential developed across the resistor 25 by this current flow is represented on a logarithmic-time scale by curve C of Fig. 3 and reaches a maximum value at a time $t_1$ after the initiation of the signal at the time $t_0$. The maximum amplitude of the signal of curve C is determined by the limiting level established in the unit 23. The signal represented by curve C is divided down by the voltage divider 30, 31 and applied to the adjustable voltage dividers 26, 27. The portion of this signal developed across the resistor 29 is then applied with a degenerative phase to the input circuit of the direct-coupled amplifier and limiter 23 through the resistor-condenser network 41, 42, the switch elements 40, 40f and the resistor-condenser network 43, 44. As is well known in the art, the gain of an amplifier such as the direct-coupled amplifier and limiter 23 is determined by the relative values of the amplitude of the feed-back signal developed at the movable arm 27a and the amplitude of the output signal of the direct-coupled amplifier and limiter 23 and by the relative values of the impedances of the resistor-condenser networks 41, 42 and 43, 44 and the impedances of the input circuit. Under the assumed operating conditions, the signal developed at the movable arm 27a of the voltage divider 27 is a minimum fraction of the signal developed at the cathode of tube 24 and the feed-back path includes a maximum value of impedance and, hence, the direct-coupled amplifier and limiter 23 has a maximum gain. Since the amplifier and limiter 23 has a maximum gain, the output signal of that unit and, hence, the signal developed across the resistor 25 has a maximum sweep speed as represented by curve C of Fig. 3. Accordingly, the target range displayed on the plan-position indicator 16 is a minimum and, for example, may be approximately three miles.

To decrease the sweep speed of the output signal of the unit 19 and thus to increase the target range displayed on the indicator 16, the adjustable arm 27a of the voltage divider 27 is rotated clockwise. A greater fraction of the output signal is then applied through the feed-back circuit to the input circuit of the direct-coupled amplifier and limiter 23, thus decreasing the gain of that amplifier. When the adjustable arm 27a of the voltage divider 27 has rotated through approximately 350° to its maximum potential position, the amplifier and limiter 23 has a gain which may, for example, be approximately one-tenth of its maximum gain. This gain variation of the unit 23 is represented by curve F of Fig. 4 which is a graph representing the gain of the unit 23 over a range of 700° of clockwise rotation of the arms 26a and 27a from the positions shown in Fig. 1. The output signal of the direct-coupled amplifier and limiter 23 and thus the signal developed across the cathode resistor 25 after 350° of rotation of the arm 27a, therefore, has a sweep speed, as represented by the curve D of Fig. 3, less than the sweep speed of the signal of curve C which is derived when the amplifier has maximum gain. Accordingly, the time interval $t_0$–$t_2$ is, for example, approximately ten times the interval $t_0$–$t_1$.

The sweep speed variation of the output signal of the unit 23 over a 10:1 range during the adjustment of the voltage divider 27 while that divider is coupled to the input circuit of the unit 23 is represented by the solid-line curve H of Fig. 5 which is a graph representing the sweep speed of the output signal of the unit 23 over a range of 700° of clockwise rotation of the arms 26a and 27a from the positions shown in Fig. 1. Curve H is nonlinear because of the logarithmic taper of the winding of the voltage divider 27 which causes a nonlinear variation of the degenerative feed-back signal per degree of rotation of the voltage divider arm 27a. The target range indicated on the plan-position indicator 16 may, for example, be thirty miles at the end of 350° of rotation of the arm 27a.

During the clockwise rotation of the movable arm 27a, for example, through 350°, the arm 26a also rotates through 350° and, because of the 2:1 ratio between the gears 38a and 38b, the cam 36 rotates through 175°. When the arm 27a reaches the maximum potential position thereof, because of the lead of the arm 26a that arm is at the minimum potential position thereof at the junction of the resistor 28 and the voltage divider 26. The cam 36 then has rotated sufficiently clockwise to allow the switch element 35 to contact the switch point 35s and close the series circuit comprising elements 32, 33, 34. At this time, the relays 32 and 33 are energized and cause the switch elements 21 and 40, respectively, to contact the switch points 21s and 40s. Accordingly, the voltage divider 27 and the resistor-condenser network 41, 42 then are disconnected from the resistor-condenser network 43, 44 and the voltage divider 26 is substituted therefor through the switch element 40.

Under these operating conditions, the signal supplied by the voltage divider 20, 21 to the direct-coupled amplifier and limiter 23 may, for example, have about one-eighth the amplitude of the output signal of the sweep generator 18 as represented by the broken-line curve B of Fig. 2. Because the voltage divider 26 now applies to the input circuit of the amplifier and limiter 23 a minimum potential corresponding to the minimum potential previously applied thereto by the voltage divider 27 and because the resistor-condenser network 41, 42 is no longer effective in the feed-back circuit, the amplifier and limiter 23 now has approximately eight times its gain just before the switch 35, 35s has closed. Accordingly, the output signal of the unit 23 has substantially the same sweep speed at either side of the switching point at the end of 350° of rotation of the voltage divider arm 27a and, hence, the signal developed across the resistor 25 may be represented by curve D of Fig. 3 for the condition when the switch 35, 35s is just about to close and also for the condition when the switch 35, 35s has just closed.

During further clockwise rotation of the movable arm 26a of the voltage divider 26, a greater degenerative signal is supplied by the voltage divider 26 to the amplifier input circuit and, hence, the gain of the unit 23 decreases. Since the voltage dividers 26 and 27 are of similar construction, the gain of the amplifier and limiter 23 varies, for example, over approximately a 10:1 range during the adjustment of the voltage divider 26 while that divider is coupled to the amplifier input circuit, as represented by curve G of Fig. 4. Since the adjustment of the voltage divider 26 varies the gain over a 10:1 range, the signal developed across the resistor 25 corresponding to the minimum potential position of the voltage divider arm 26a is represented by curve E as having one-tenth the sweep speed of the signal represented by curve D corresponding to the maximum potential position of the arm 26a, the time interval $t_0-t_3$ being ten times the interval $t_0-t_2$.

Broken-line curve I of Fig. 5 represents the 10:1 sweep speed range during the second 350° of rotation of the voltage divider arms 26a and 27a, that is, while the voltage divider 26 is coupled to the amplifier input circuit. Accordingly, although the gain of the unit 23 varies over only approximately a 12:1 range during the adjustment of the voltage divider arms 26a ano 27a through 700°, the sweep speed of the output signal of the unit 23 varies over a continuous 100:1 range as represented by curves H and I of Fig. 5.

From the foregoing description, it will be apparent that a control system constructed in accordance with the invention has the advantage that the system adjusts over a wide range of sweep speeds the sweep speed of a periodic signal having an amplitude which sweeps over a range of amplitudes for application to a deflection circuit of an indicator of a radar system.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a system for supplying a periodic output signal having a magnitude which sweeps over a range of magnitudes at a speed which is adjustable over a wide range of speeds, a control system for adjusting the sweep speed of the output signal comprising: an amplifier having input and output circuits; supply terminals for supplying to said input circuit a first periodic signal having a magnitude which sweeps over a range of magnitudes at a predetermined speed; a first signal divider included in said input circuit and coupled to said supply terminals for deriving a second periodic signal and adjustable to a plurality of values for adjusting the magnitude of said second signal to determine a range of sweep speeds for said output signal for each value of said signal divider; a feed-back circuit coupled between said output circuit and said input circuit and including a pair of signal dividers for deriving a pair of signals from said output signal for application to said input circuit, each of said dividers being adjustable over a range of values for continuously adjusting a gain characteristic of said control system to vary the sweep speed of said output signal over each determined range; and switch means coupled to said pair of signal dividers and said input circuit and responsive to the adjustment of said pair of signal dividers for applying one of said derived signals to said input circuit over one determined range of sweep speeds and effective at the end of said one determined range of sweep speeds to apply the other of said derived signals to said input circuit and to adjust said first signal divider to a different value for determining another range of sweep speeds; the values of said first signal divider being so proportioned with respect to the values of said feed-back circuit at either side of the end of said one determined range that the minimum sweep speed in said one determined range is substantially the same as the maximum sweep speed in the succeeding determined range, thereby effectively providing a single continuous wide range of sweep speeds.

2. In a system for supplying a periodic signal having a magnitude which sweeps over a range of magnitudes at a speed which is adjustable over a wide range of speeds, a control system for adjusting the sweep speed of the supplied signal comprising: a first circuit means adjustable to a plurality of sweep speed range-control values for adjusting a first sweep speed control parameter of said control system to determine a range of magnitude sweep speeds for each value thereof; a second circuit means adjustable over a range of values for continuously adjusting a second sweep speed control parameter of said control system to vary the magnitude sweep speed of said signal over each determined range; and means responsive to the adjustment of said second circuit means and effective at a predetermined point in the range of adjustment thereof to adjust said first circuit means to a different value for determining another range of magnitude sweep speeds.

3. In a system for supplying a periodic output signal having a magnitude which sweeps over a range of magnitudes at a speed which is adjustable over a wide range of speeds, a control system for adjusting the sweep speed of the output signal comprising: an amplifier having an input circuit; supply terminals for supplying to said input circuit a first periodic signal having a magnitude which sweeps over a range of magnitudes at a predetermined speed; a first circuit means included in said input circuit and coupled to said supply terminals and adjustable to a plurality of values for effecting adjustable attenuation of said first signal to derive a second periodic signal of adjustable magnitude which determines a range of sweep speeds for said output signal for each adjustment thereof; a second circuit means adjustable over a range of values for continuously adjusting another parameter of said control system to vary the sweep speed of said output signal over each determined range; and means responsive to the adjustment of said second circuit means and effective at a predetermined point in the range of adjustment thereof for adjusting said first circuit means to a different value for determining another range of sweep speeds.

4. A system for supplying a periodic output signal having a magnitude which sweeps over a range of magnitudes at a speed which is adjustable over a wide range of speeds comprising: supply terminals for supplying a first periodic signal having a magnitude which sweeps over a range of magnitudes at a predetermined speed; a signal divider coupled to said terminals and adjustable for effecting adjustable attenuation of said first signal to derive a second periodic signal of adjustable magnitude which determines a range of sweep speeds for said output signal for each adjustment thereof; circuit means adjustable over a range of values for continuously adjusting another parameter of said system to vary the sweep speed of said output signal over each determined range; and means responsive to the adjustment of said circuit means and effective at a predetermined point in the range of adjustment thereof to adjust said signal divider to derive a signal of different magnitude for determining another range of sweep speeds.

5. In a system for supplying a periodic signal having a magnitude which sweeps over a range of magnitudes at a speed which is adjustable over a wide range of speeds, a control system for adjusting the sweep speed of the supplied signal comprising: a first circuit means adjustable to a plurality of sweep speed range-control values for adjusting a first sweep speed control parameter of said control system to determine a range of magnitude sweep speeds for each value thereof; a second circuit means responsive to said supplied signal and adjustable over a range of values for continuously adjusting a second sweep speed control parameter of said control system to vary the magnitude sweep speed of said signal over each determined range; and means responsive to the adjustment of said second circuit means and effective at a predetermined point in the range of adjustment thereof to adjust said first circuit means to a different value for determining another range of magnitude sweep speeds.

6. In a system having an output circuit for supplying a periodic signal having a magnitude which sweeps over a range of magnitudes at a speed which is adjustable over a wide range of speeds, a control system having an adjustable effective gain for adjusting the sweep speed of the supplied signal comprising: a first circuit means adjustable to a plurality of values for adjusting a parameter of said control system to determine a range of sweep speeds for each value thereof; a feed-back circuit coupled between said output circuit and said first circuit means and adjustable over a range of values for continuously adjusting the effective gain of said control system to vary the sweep speed of said signal over each determined range; and means responsive to the adjustment of said feed-back circuit and effective at a predetermined point in the range of adjustment thereof to adjust said first circuit means to a different value for determining another range of sweep speeds.

7. In a system for supplying a periodic signal having a magnitude which sweeps over a range of magnitudes at a speed which is adjustable over a wide range of speeds, a control system for adjusting the sweep speed of the supplied signal comprising: a first circuit means adjustable to a plurality of values for adjusting a parameter of said control system to determine a range of sweep speeds for each value thereof; a second circuit means including a signal divider adjustable over a range of values and responsive to said supplied signal for continuously adjusting a gain characteristic of said control system to vary the sweep speed of said signal over each determined range; and means responsive to the adjustment of said second circuit means and effective at a predetermined point in the range of adjustment thereof to adjust said first circuit means to a different value for determining another range of sweep speeds.

8. In a system for supplying a periodic signal having a magnitude which sweeps over a range of magnitudes at a speed which is adjustable over a wide range of speeds, a control system having an adjustable effective gain for adjusting the sweep speed of the supplied signal comprising: an amplifier having input and output circuits; a first circuit means adjustable to a plurality of values for adjusting a parameter of said control system to determine a range of sweep speeds for each value thereof; a pair of signal dividers coupled to said output circuit for deriving a pair of signals from said supplied signal for application to said input circuit, each of said dividers being adjustable over a range of values for continuously adjusting the effective gain of said control system to vary the sweep speed of said supplied signal over each determined range; and switch means coupled to said pair of signal dividers and said input circuit and responsive to the adjustment of said signal dividers for applying one of said derived signals to said input circuit over a portion of the adjustment range of said signal dividers and effective at a predetermined point in said adjustment range to apply the other of said derived signals to said input circuit and to adjust said first circuit means to a different value for determining another range of sweep speeds.

9. In a system for supplying a periodic signal having a magnitude which sweeps over a range of magnitudes at a speed which is adjustable over a wide range of speeds, a control system for adjusting the sweep speed of the supplied signal comprising: a first circuit means adjustable to a plurality of sweep speed range-control values for adjusting a first sweep speed control parameter of said control system to determine a range of magnitude sweep speeds for each value thereof; a second circuit means adjustable over a range of values for continuously adjusting a second sweep speed control parameter of said control system to vary the magnitude sweep speed of said signal over each determined range; and switch means mechanically coupled to said second circuit means and effective at the end of one determined range to adjust said first circuit means to a different value for determining another range of magnitude sweep speeds.

10. In a system for supplying a periodic signal having a magnitude which sweeps over a range of magnitudes at a speed which is adjustable over a wide range of speeds, a control system for adjusting the sweep speed of the supplied signal comprising: a first circuit means adjustable to a plurality of sweep speed range-control values for adjusting a first sweep speed control parameter of said control system to determine a range of magnitude sweep speeds for each value thereof; a second circuit means adjustable over a range of values for continuously adjusting a second sweep speed control parameter of said control system to vary the magnitude sweep speed of said signal over each determined range; and means responsive to the adjustment of said second circuit means effective at a predetermined point in the range of adjustment thereof to adjust said first circuit means to a different value for determining another range of magnitude sweep speeds; the values of said first circuit means being so proportioned with respect to the values of said second circuit means at either side of said predetermined point that the minimum sweep speed in one determined range is substantially the same as the maximum sweep speed in the succeeding determined range, thereby effectively providing a single continuous wide range of sweep speeds.

References Cited in the file of this patent

UNITED STATES PATENTS

| | | |
|---|---|---|
| 2,300,189 | Wolff | Oct. 27, 1942 |
| 2,433,782 | Murdoch, Jr. | Dec. 30, 1947 |
| 2,572,725 | Hirsch | Oct. 23, 1951 |
| 2,588,114 | Haworth | Mar. 4, 1952 |